United States Patent [19]

Jablonsky

[11] 4,186,818
[45] Feb. 5, 1980

[54] AUXILIARY POWER STEERING FOR MOTOR VEHICLES

[75] Inventor: Erich Jablonsky, Boebingen, Fed. Rep. of Germany

[73] Assignee: Zahnradfabrik Friedrichshafen AG, Friedrichshafen, Fed. Rep. of Germany

[21] Appl. No.: 923,682

[22] Filed: Jul. 11, 1978

[51] Int. Cl.² ............................................. B62D 5/08
[52] U.S. Cl. .................................................. 180/133
[58] Field of Search ................... 180/133, 146; 91/422, 91/374, 375 A

[56] References Cited

U.S. PATENT DOCUMENTS

| | | | |
|---|---|---|---|
| 3,180,233 | 4/1965 | Jablonsky | 91/374 |
| 3,602,101 | 8/1971 | Jablonsky | 91/422 |
| 3,602,327 | 8/1971 | Garrison | 180/133 |
| 3,822,759 | 7/1974 | Sheppard | 180/133 |
| 3,848,693 | 11/1974 | Sheppard | 180/133 |

Primary Examiner—Joseph F. Peters, Jr.
Assistant Examiner—Randall A. Schrecengost
Attorney, Agent, or Firm—Zalkind & Shuster

[57] ABSTRACT

A dual hydraulic system comprising two independent power steering hydraulic circuits is provided wherein a first hydraulic circuit is used primarily for normal steering and a second hydraulic circuit is used where increased steering power is needed as in rough terrain driving or in parking a vehicle. The arrangement provides for each circuit carrying about half the increased load. Respective valve mechanisms under operator control via a steering wheel controls pressure and exhaust of the double acting power cylinders of the respective circuits. Actuation of the two valve mechanisms is effected in a sequential order so that ordinarily the first hydraulic circuit is operative, followed by the operation of the second hydraulic circuit responsive to increase in steering load as would be occasioned in cross country rough terrain driving or in a vehicle parking situation.

8 Claims, 3 Drawing Figures

AUXILIARY POWER STEERING FOR MOTOR VEHICLES

Cross reference is made to the following patent applications:

Ser. No. 918,422, filed by ERICH JABLONSKY on June 23, 1978, for: AUXILIARY POWER STEERING FOR MOTOR VEHICLES;

Ser. No. 923,679, filed by KARL-HEINZ LIEBERT on July 11, 1978, for: HYDROSTATIC TWOCIRCUIT STEERING ARRANGEMENT;

Ser. No. 935,947 filed by WERNER TISCHER on Aug. 23, 1978, for: TWO CIRCUIT STEERING ARRANGEMENT FOR MOTOR VEHICLES.

The preceding applications are all assigned to the Assignee of this application.

The present invention combines certain features of prior art patents, such as the U.S. Pat. No. 3,180,233, to Jablonsky also German DAS 1,133,642 (1962) and the U.S. Pat. No. 3,602,101 to Jablonsky et al. Reference is made to German application 1,816,295 (1970) which is the counterpart of U.S. Pat. No. 3,602,101, and also to German Pat. No. 1,157,945 (1963).

Basically the invention herein combines the general and specific structures of the aforementioned U.S. patents for the purpose of valve control of two separate hydraulic steering circuits for vehicle steering, wherein the activation of the circuits is in sequence dependent upon the steering load encountered.

The U.S. Pat. No. 3,822,759, to Sheppard, is prior art showing two hydraulic steering circuits for doubling the power applied to a steering load wherein both circuits are activated simultaneously, and not sequentially responsive to load demand.

The present invention by a simple and unique coaction arranged between certain prior art valve mechanisms achieves the applicant's purpose of sequential control automatically so that only half the available power is ordinarily used except when steering load becomes very heavy due to operating a vehicle in cross country driving over rough terrain or when parking the vehicle.

The particular advantage of combining the constructions of the prior art is the affording of a dual valving control of very short overall length for a pair of hydraulic steering circuits as well as minimizing the hydraulic flow passages required for the overall device from a standpoint of compactness, since all mechanical parts are in a single housing.

A further advantage is the fact that in normal driving operation only half the quantity of oil for which the engine must supply pumping energy is utilized, unless load demand requires operation of both hydraulic steering circuits.

In general construction the invention may be briefly described with reference to the U.S. patents referred to hereinabove as a compact single housing arrangement wherein a portion of the housing contains valve mechanism for a first hydraulic steering circuit which is incorporated within the power piston of a double acting booster cylinder of that circuit, all as shown in U.S. Pat. No. 3,602,101. In the arrangement of that patent, a steering worm extends through the piston and carries a steering nut with threaded coaction having an actuator finger that operates a slidable valve likewise carried by the piston. A pair of compression springs disposed on opposite sides of the actuator finger effect return bias means for returning the valve to a centered or neutral straight ahead steering position. The upper portion of the housing carries a pair of slidable valves as shown in U.S. Pat. No. 3,180,233 operable by means of a steering spindle concentric within a spindle head sleeve and wherein a torque rod connects the steering spindle with the spindle head sleeve, such sleeve being integral with the steering worm. This is the valving control of the second hydraulic steering circuit which comes into play under heavy load.

By making the torque rod relatively stiff against torsional stress as compared with making the compression springs lightly prestressed, the resiliency of the torque rod is dominant over that of the compression springs. Accordingly, when the steering spindle is first rotated by manual force on the hand wheel the result is to initially actuate the valve of the first hydraulic steering circuit up to a predetermined point at which a limiting stop affords a reaction support so that continued manual rotation of the steering wheel will effect a torsional stress in the torque rod to produce relative rotation between the steering spindle and the spindle head sleeve thus actuating the valves which bring into play the second hydraulic steering circuit. A sequential application of power is achieved thereby to meet load demand in a very simple and compact manner.

The invention is entirely mechanical in operation insofar as the novelty claimed herein is concerned. Actual flow connections and passages are conventional and as known in the prior art, save to say that each hydraulic steering circuit has an engine driven pump and as a further matter of compactness such pumps may be arranged in tandem.

A detailed description of the invention now follows in connection with the appended drawing in which.

Figure 1:
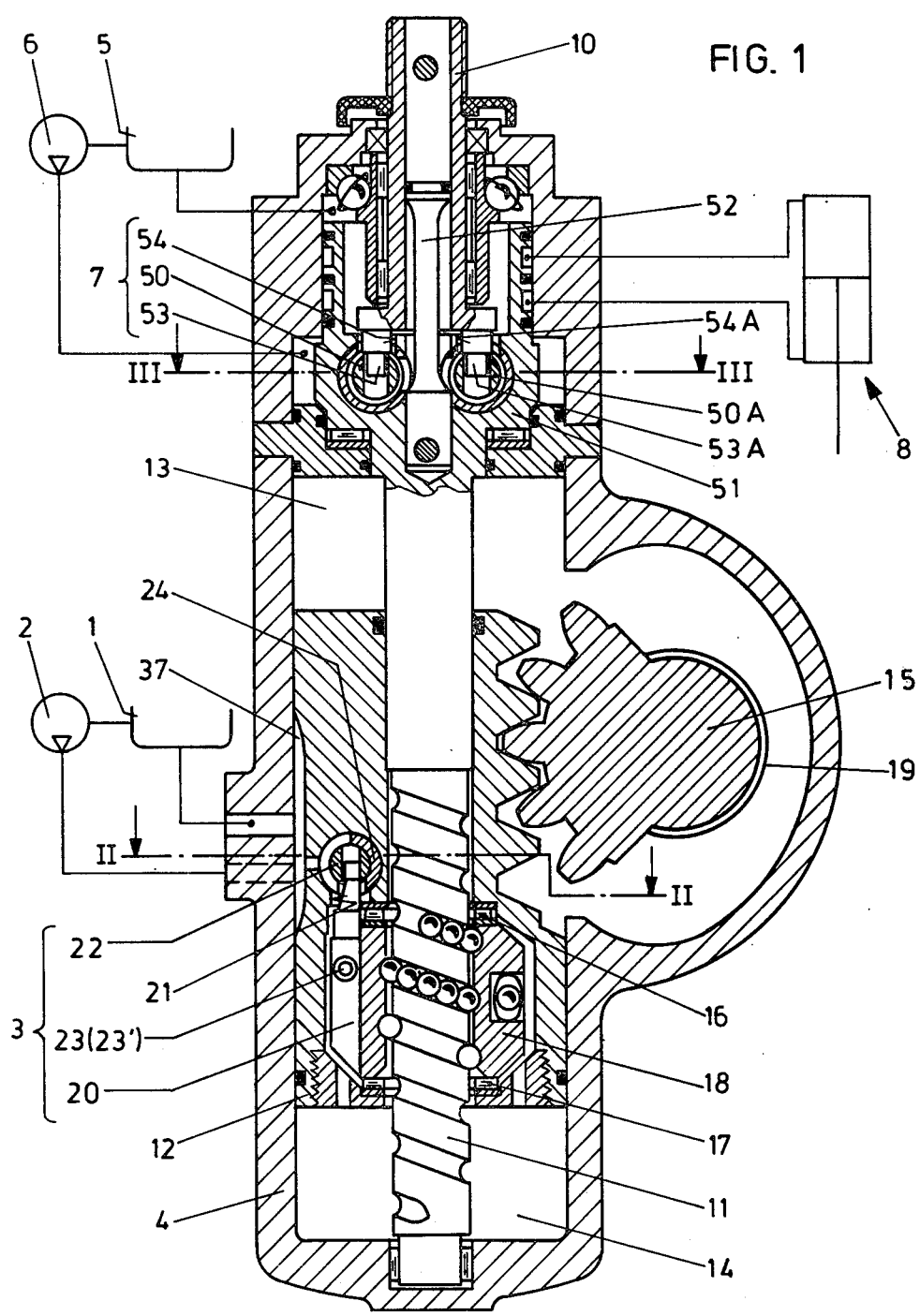
FIG. 1 is a longitudinal cross section showing all essential mechanical features of the invention comprising the valve mechanisms of the two hydraulic steering circuits.

Referring to FIG. 1, the first hydraulic steering circuit comprises the sump or tank 1, engine driven pump 2, and the valving mechanism 3 which controls the double acting hydraulic power cylinder 4 having pressure chambers 13 and 14.

The second hydraulic steering circuit comprises the sump or tank 5, engine driven pump 6, valve mechanism 7, and double acting hydraulic power cylinder 8. A steering spindle 10 understood to be operated by a manual steering wheel extends into the housing concentric in a spindle head sleeve 51 which has the usual steering worm 11 extending through a power piston 12 with opposite ends facing into pressure chambers 13 and 14, wherein a gear sector 15 in pressure chamber 13 is driven by the gear rack in the side of the piston, all in a conventional manner. It will be understood that gear sector 15 is linked to steering linkage, not shown, via a shaft 19, likewise conventional.

The valve mechanism 3 is within the piston 12 and comprises a rotative steering nut 18, having limited rotation and which carries a valve actuator finger 20 wherein nut 18 is supported intermediate thrust bearings 16 and 17. Actuator finger 20 extends through an oversized bore 21, the sides of which serve as limit stops for movement of nut 18 and which bore is machined into piston 12. Actuator finger 20 actuates a slidable spool type valve member 22 maintained in centered position in sleeve 24 fixed in a transverse bore of the piston, by compression springs 23 and 23' carried within piston 12 and engaging on respective opposite sides of actuator finger 20. The springs are a valve return bias means and are also effective for adjustment of a centered or neutral position of the valve member 22, all of the construction being clearly shown in U.S. Pat. No. 3,602,101, hereinbefore mentioned and accordingly need not be repeated herein. Thus, the valve member 22 has reciprocal motion bidirectionally limited, as noted above, to a predetermined extent by the size of bore 21, as will be clear from FIG. 1, and as heretofore known in the prior art in the aforementioned patent.

Figure 2:
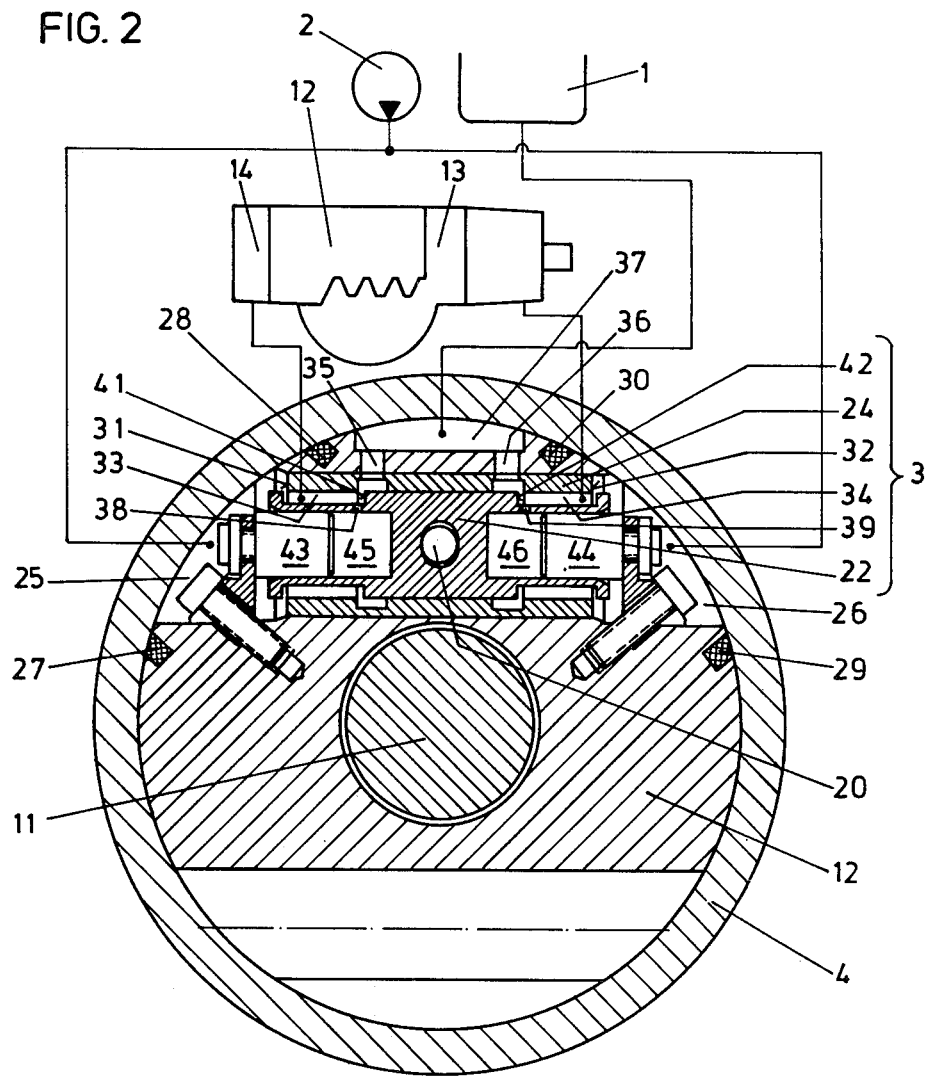
FIG. 2 is a radial section through II—II of FIG. 1 to an enlarged scale.

Referring to FIG. 2, showing the second hydraulic steering circuit, the engine driven pump 2 communicates with pressure supply chambers 25 and 26 within the housing, as will be apparent, which chambers are demarcated by longitudinal cutting of the piston adjacent the valve constructions, all as heretofore known, wherein seals 27, 28 for chamber 25, and seals 29, 30 for chamber 26, seal these chambers against pressure leakage.

In the neutral position shown in the drawing, the pressure supply chambers 25 and 27 communicate with an exhaust chamber 37, effected by a longitudinal piston groove, which connects to tank 1, such communication being between the open gaps 31 and 32 effected at the ends of respective flow passage grooves 33 and 34 of valve member 22 and thence via the open gaps 41 and 42 at the opposite ends of the respective grooves. Thus there is a circulating flow from pump 2 to tank 1 in the neutral position of the first hydraulic steering circuit and no pressure exists in the cylinder chambers 13 and 14 at this time. Grooves 33 and 34 have communication via connecting throttle means 38 and 39 respectively to respective reaction chambers 45 and 46 fashioned in the ends of the valve member which coact with respective pistons 43 and 44 carried by piston 12 and which close the reaction chambers except for the throttling ports described, an arrangement of the prior art, and wherein the reaction chambers are likewise in communication with exhaust in the neutral position of valve member 12.

In operation, if valve 22 be moved to the left pressure supply chamber 25 communicates with cylinder pressure chamber 14 via the gap 31 and groove 33. At this time pressure chamber 13 of the cylinder communicates with the exhaust return groove 37 via the groove 34 and open gap 42 and the bore 36 through the wall of the sleeve 24. Accordingly, power piston 12 shifts to the right for steering purposes. At this time, the operating pressure in chamber 14 communicates with reaction chamber 45 via throttle bore 38 to effect a force opposite to the manual steering force, which force is exerted against valve member 22. On the other hand, groove 34 communicates with exhaust and therefore there is no pressure in reaction chamber 46 at this time. Accordingly, the unbalanced pressure acting on the ends of valve 22 is against the drive force of actuator finger 20 in order to give simulated road resistance.

Figure 3:
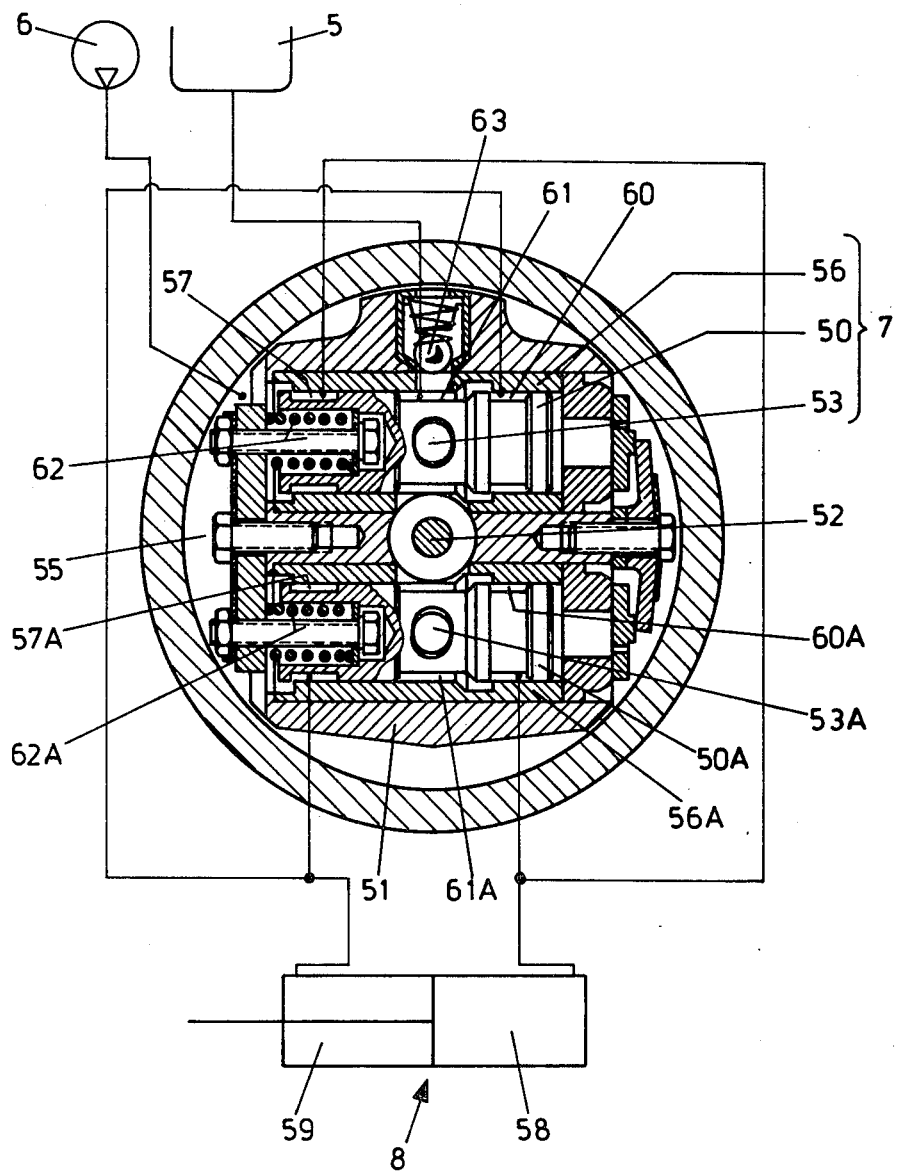
FIG. 3 is a radial section through III—III of FIG. 1 to an enlarged scale.

Referring to FIGS. 1 and 3, with regard to the second hydraulic steering circuit, two valve members 50 and 50A of the valve mechanism 7 are carried in transverse bores in respective sleeves 56 and 56A on opposite sides of torque rod 52, a valve return bias means. The bores are in the spindle head sleeve 51 which concentrically carries the steering spindle 10 with the torque rod 52 concentric therein which connects between the spindle head sleeve and the steering spindle in the conventional manner as shown. Vehicle operator rotation (via hand wheel) of steering spindle 10 can effect a twist of the rod against the reaction support provided by the worm 11 acting against the resistance to movement of piston 12. Thus a relative rotative motion of the steering spindle and spindle head sleeve effects arcuate motion around the torque rod axis of valve member drive pins 53 and 53A extending into the respective valve members for actuation thereof. The drive pins extend through respective oversize bores 54 and 54A of the spindle head sleeve to be limited in motion according to the designed size of bores 54 and 54A. Accordingly, the valve members, shifting in opposite directions effect pressure and exhaust control of the second circuit power cylinder 8 wherein oil under pressure can communicate with either chamber of that power cylinder while the other chamber is being exhausted.

Referring to FIGS. 1 and 3, pump 6 of the second steering circuit provides pressure oil from tank 5 to the housing pressure supply chamber 55 which sealing surrounds the valve member portion of spindle head sleeve 51. Upon rotation of the steering spindle 10 by a hand steering wheel, valve members 50 and 50A are actuated in respective directions depending upon direction of rotation of the steering spindle up to limits provided by the size of the respective bores 54 and 54A in the spindle head sleeve 51. Accordingly, pressure fluid from supply chamber 55 will furnish oil under pressure to pressure chamber 58 or 59 of the power cylinder 8 via the valve members through groove 57 or 57A. Oil return is effected from the opposite chamber via a groove 60 or 60A in the respective valve members and via respective annular grooves 61 or 61A to tank 5. In the straight ahead steering or neutral position of the valve members, as shown in FIG. 3, all grooves of the valve members are open so that the output of pump 6 circulates through the valve mechanism 3 to tank 5.

Each valve member is provided with a bolt and spring centering device, respectively 62 and 62A, which is likewise useable for precise adjustment of the valve members within their respective sleeves and also such devices provide reaction support for the torque rod 52 when the valve members are returned from a steering function to a neutral position. A check valve 63 is disposed between the pressure fluid supply chamber 55 and the grooves 61 and 61A so that in the event of failure of pump 6, or in the event that the pump 6 is not operating, oil can be sucked out of the valve member arrangement, a heretofore known feature.

A particular feature of the invention believed to be unique is the combination of the springs 23 and 23' of the steering mechanism 3 of the first hydraulic steering circuit in coaction with the torque bar 52 of the second hydraulic steering circuit wherein these members serve as return elements for their respective valve members 24 and 50, 50A to neutral position after a steering function. Thus a return bias means having different spring forces are used whereby a differential of manual effort applied in steering the respective valve mechanisms is effected. In the present instance, the torque rod 52 is relatively stiff in torsion as compared with the more easily compressed springs 23, 23'.

Accordingly, upon rotation of steering spindle 10, the valve member 22 is initially actuated via steering nut 18 and actuator finger 20 to pressurize one or the other of pressure chambers 13 and 14 of the first hydraulic circuit. At this time, the torque rod is relatively unyielding, or at least not yielding to an extent to shift valve members 50 and 50A, and the second hydraulic circuit remains in neutral position as output of pump 6 continues to circulate to tank 5. However, as steering resistance increases and thus manual force on the steering spindle 10 increases, for example, in cross-country or rough terrain travel, or when parking a vehicle, the usual twisting of torque rod 52 will occur thereby shifting valve members 50 and 50A to pressurize one or the other of the pressure chambers 58 or 59 of power cylinder 8, depending upon steering direction effected by the vehicle operator. When the force exerted by the vehicle operator on steering spindle 10 decreases during the course of the turn the torque rod 52 will return valve members 50 and 50A back to neutral position in conjunction with the respective centering devices 62, leaving the first hydraulic steering circuit comprising valve member 22 still in operative steering position, unless of course the steering wheel is brought back all the way for straight ahead steering.

From the above it will be apparent that an energy economy is effected since the second hydraulic circuit is utilized only as required and otherwise provides for oil circulation from pump to tank without doing any work.

Both pumps 2 and 6 are driven by the vehicle engine so that either hydraulic circuit can be used in the event of breakdown of the other circuit for any reason, although it will be appreciated that in the event of breakdown of the first hydraulic circuit wherein only the relatively weak springs 23 and 23' are compressed to make the circuit operative, the second circuit can be brought into play with somewhat increased manual effort due to the need of effecting twist in the relatively rigid torque rod. Also, the second steering circuit comprising the valve members 50 and 50A are not provided with reaction chambers inasmuch as when such circuit is brought into play the increased resistance of effecting twist in the torque rod sebsequent to operation of the springs 23 and 23' are considered sufficient to effect a reaction force. This brings about an economy of production as well as an advantage in not artificially creating a greater resistance to steering in the course of parking where such resistance is not essential.

Accordingly, by dividing up the total work load between two hydraulic steering circuits a greater efficiency is effected in that only half of the total oil volume pumped is under pressure to be utilized, except under such conditions where both circuits are required. Further, the reaction chamber arrangement of the first circuit can be designed to give as great a reaction force as may be desired in order to simulate road feel, effecting an improvement in straight ahead travel characteristics.

The invention herein is also susceptible to a change wherein a reserve pump driven by the vehicle wheels and connecting via a valve, as in German Pat. No. 1,157,945, with either of the hydraulic steering circuits herein can be utilized. Thus, a high degree of safety of steering can be achieved should the engine fail with failure of pressure output from the pumps of both of the hydraulic circuits.

I claim:

1. In a dual system for power steering of a vehicle wherein said system has a pair of hydraulic circuits, each circuit comprising a pump, a double acting power cylinder and a valve mechanism; the improvement which comprises:

a first hydraulic steering circuit wherein the double acting cylinder (4) has a piston therein with the valve mechanism of said circuit carried thereby and comprising a moveable valve means (22) and resilient means (23, 23') for effecting return to a neutral position of said valve means from a steering position and an actuator means (51, etc.) for actuating said valve means;

a second hydraulic steering circuit having the valve mechanism thereof comprising moveable valve means (50, 50A) and resilient means (52) for return bias thereof to a neutral position from a steering position;

a manually operable actuator means (10) connected to operate the second steering circuit valve means (50, 50A), and connected to the actuator means (51) of said first hydraulic steering circuit by the resilient means (52) of said second hydraulic steering circuit for operation of said latter actuator means (51);

wherein said latter resilient means (52) is of a lesser resiliency than that of the first hydraulic steering circuit so that initially upon operation of said manually operable actuator means (10) the actuator means (51) of the first hydraulic circuit is operated by connection with said latter resilient means (52) whereby to effect operation to a predetermined position of the valve means (22) of the first hydraulic steering circuit and means (21) whereby continued operation of the manually operable actuator means (10) effects yielding of the latter resilient means (52) to effect a subsequent operation of the valve means (50, 50A) of the second hydraulic steering circuit.

2. In a system as set forth in claim 1, said valve means of said first hydraulic steering circuit being provided with road resistance simulation means (43, 46).

3. In a system as set forth in claim 1, including a steering worm (11) connecting said piston (4) with said second hydraulic steering circuit actuator means (51);

a steering nut (18) having relative rotation on said worm and having an actuator finger (20) extending longitudinally of said piston;

said valve means (22) of said first hydraulic circuit comprising a slidable valve carried in a transverse bore of said piston and said actuator finger extending into said valve for reciprocal movement thereof upon rotation of said steering nut; and said means (21) to effect said yielding comprising motion limiting means carried by said piston and bidirectionally engageable by said actuator finger wherein said engagement effects a reaction support for stressing said resilient means (52) of said second hydraulic steering circuit to permit relative motion between said actuator means (10, 51) to effect operation of the valve means (50, 50A) of said second hydraulic circuit.

4. In a system as set forth in claim 3, said second hydraulic steering circuit actuator means (51) comprising a spindle head sleeve, the valve means (50, 50A) of said second hydraulic circuit comprising a pair of reciprocal valves carried in transverse bores of said sleeve;

the first hydraulic circuit actuator means comprising a steering spindle within said spindle head sleeve and having respective actuator pins engaging said valves for actuation thereof.

5. In a system as set forth in claim 4, said valves (50, 50A) of said second hydraulic circuit having respective means (62, 62A) for effecting a centered neutral position within respective bores.

6. In a system as set forth in claim 1, wherein the resilient return means (23, 23') of said first hydraulic steering system comprises compression spring means and wherein the resilient return means (52) of said second hydraulic circuit comprises a torque rod.

7. An arrangement for actuating a pair of valve means (22; 50, 50A) in sequential order wherein each valve means has a respective valve actuator (10, 51) which are relatively rotative;

each valve means having a respective resilient return bias means (23, 23'; 52);

the return bias means (52) of one valve means (50, 50A) dominating the return bias means (23, 23') of the other valve means (22) and the actuators being connected to each other by said dominant return bias means (52) so as to effect actuation of the other valve means (22) against its yielding return bias means (23, 23') by rotation of one actuator (10), acting through said dominant return bias means (52), to a predetermined position of said other valve means and means effective at that time whereby said dominant return bias means (52) then yields to permit rotation of the other actuator (51) upon continued rotation of said one actuator (10).

8. An arrangement as set forth in claim 7 in combination with a dual hydraulic circuit power steering system, each circuit comprising a pump and a booster power cylinder wherein the sequential order of rotation of said actuators effects respective valve means operation to sequentially pressurize respective booster power cylinders to meet increased steering load.

* * * * *